United States Patent Office 3,468,896
Patented Sept. 23, 1969

3,468,896
METHOD OF PREPARING 2-PYRIDINE-ALDOXIME METHOCHLORIDE
Gordon S. Myers, Mount Royal, Quebec, and Timothy J. Mepham, Westmount, Quebec, Canada, assignors to American Home Products Corporation, New York, N.Y., a corporation of Delaware
No Drawing. Filed July 16, 1965, Ser. No. 472,736
Int. Cl. C07d *31/40, 31/48;* A61k *27/00*
U.S. Cl. 260—296                    2 Claims

ABSTRACT OF THE DISCLOSURE

There is disclosed herein a process for preparing 2-pyridinealdoxime methochloride by reaction 2-pyridinealdoxime with dimethylsulfate to obtain an intermediate metho-methylsulfate; and then reacting the latter, without isolation, with the hydrochloride salt of a hydrocarbon amine thereby obtaining the desired methochloride in high yields and in a high state of purity.

---

The present invention relates to an improved process for preparing 2-pyridinealdoxime methochloride, a valuable product useful as an antagonist to anticholinesterases and commonly employed in the treatment of insecticide poisoning, in opthalmology, in the treatment of myasthenia gravis, and for the management of toxic reactions to chemical warfare agents.

The known methods for preparing 2-pyridinealdoxime methochloride include the conversion of 2-pyridinealdoxime methiodide to the corresponding chloride salt with silver chloride or by means of ion exchange resins; the direct quaternization of 2-pyridinealdoxime with methyl chloride in dimethylformamide under pressure; and the conversion of 2-pyridinealdoxime metho-methylsulfate to the desired methochloride salt by means of hydrogen chloride or hydrochloric acid in a water-miscible organic solvent such as isopropanol, isobutanol, acetone, ethanol, methanol, propylene glycol, or dioxane.

The known methods for the preparation of 2-pyridinealdoxime methochloride listed above have several disadvantages; thus, the conversion of the methiodide salt to the methochloride with silver chloride is expensive and leaves traces of silver in the final product which are difficult to remove; the direct quaternization with methyl chloride has to be carried out in costly pressure vessels using an expensive solvent and gives comparatively poor yields; finally, the method listed above in the last instance involves the preparation and isolation of the intermediate 2-pyridinealdoxime metho-methylsulfate salt which is then converted in a separate step to the desired methochloride salt.

We have now found that it is possible to prepare 2-pyridinealdoxime methochloride in a single-step and highly economical procedure which gives excellent yields of the desired product in a high degree of purity. The particular advantages of our method consist not only in the fact that we are able to prepare 2-pyridinealdoxime methochloride in a single-step procedure from easily available starting materials in highly satisfactory yields and with a high degree of purity, but also in the use of inexpensive solvents and reagents. The methods previously known had relied upon a large molar excess of reagent over reactant in each instance. This contributed to the formation of undesirable by-products and made it comparatively difficult to obtain the desired final product in a high degree of purity and in satisfactory yields. We prefer to employ only substantially equimolar ratios of reagents to reactants, with only a small excess of the former over the latter, so that the formation of by-products is minimized, the purification of the desired final product is greatly facilitated, and the process made highly economical.

More specifically, we prefer to prepare the intermediate 2-pyridinealdoxime metho-methylsulfate by reacting 2-pyridinealdoxime with a small molar excess of dimethylsulfate not exceeding 10 percent, preferably 1.1 equivalents, in solution in a water-immiscible aromatic hydrocarbon solvent, using approximately four parts of solvent per part of 2-pyridinealdoxime. Benzene, toluene and xylene are the preferred solvents. The reaction is preferably carried out at slightly elevated temperatures of from 40 to 50° C. and for periods of time of from one to four hours, with 2.25 hours being the preferred time of reaction. However, the resultant 2-pyridinealdoxime metho-methylsulfate is not isolated although it is obtained in substantially quantitative yields. Contrary to the methods previously described, it is reacted immediately with the hydrochloride salt of a primary, secondary, or tertiary aliphatic, cycoaliphatic, or heterocyclic amine containing from 4 to 6 carbon atoms. Preferred amines are butylamine, diethylamine, triethylamine, cyclohexylamine, pyrrolidine, or piperidine. The latter amine hydrochloride is used with the addition of 6 to 8 parts per part of 2-pyridinealdoxime of a water-immiscible lower aliphatic chlorinated hydrocarbon solvent such as chloroform, methylene dichloride, or ethylene dichloride. Chloroform and methylene dichloride are the preferred solvents. The resultant mixture is stirred at room temperature for periods of time of from 1 to 16 hours during which interval the desired metathesis takes place, with formation of the desired 2-pyridinealdoxime methochloride in excellent yields while the amine methylsulfate remains in solution in the mixture of aromatic hydrocarbon solvent and lower aliphatic chlorinated hydrocarbon solvent.

To obtain optimal yields of the desired 2-pyridinealdoxime methochloride several of the criteria listed above have to be observed closely. Thus, it is possible to replace the aromatic hydrocarbon solvent used in the first stage of the reaction by lower aliphatic chlorinated hydrocarbon solvents such as chloroform, methylene dichloride, or ethylene dichloride, but this results in considerably lower yields of 2-pyridinealdoxime methochloride.

Although the second stage of the above reaction is a simple metathesis in which the methylsulfate ion is exchanged for the chloride ion, we have found that neither anhydrous hydrogen chloride, nor hydrochloric acid, nor ammonium chloride give the desired results. The lower aliphatic amines containing less than four carbon atoms such as methylamine, ethylamine, or isopropylamine, are equally unsatisfactory, because we have found that their methylsulfate salts are sufficiently insoluble in the solvent mixture employed to co-precipitate with the desired 2-pyridinealdoxime methochloride, giving oily mixtures which are difficult to separate and even more difficult to purify. The nature of the solvent employed in the second stage of the above reaction is equally critical, with chloroform and methylene dichloride giving the best results, and ethylene dichloride giving yields which are only slightly lower.

In this second stage of the above reaction it is also important to use well-defined amounts of the amine hydrochlorides to effect the desired metathesis. Insufficient amounts result in an incomplete reaction, and too large amounts will result in undissolved amine hydrochloride remaining in the mixture and being isolated together with the desired 2-pyridinealdoxime methochloride. Both those measures tend to lower the yield of desired final product. We have found that 1–2 moles of amine hydrochloride per mole of 2-pyridinealdoxime may be used, and we prefer to use 1.2 moles of amine hydrochloride per mole of 2-pyridinealdoxime to obtain optimal results.

The following examples will illustrate our invention.

fate and 1.2 moles of the respective amine hydrochloride per mole of 2-pyridinealdoxime, the following yields of 2-pyridinealdoxime methochloride are also obtained:

| Example No. | First Stage | | | Second Stage | | Reaction time, hrs. | Yield, crude | Percent pure |
| --- | --- | --- | --- | --- | --- | --- | --- | --- |
| | 2-pyridine-aldoxime, g. | Solvent, ml. | Dimethylsulfate, ml. | Amine hydrochloride, g. | Solvent, ml. | | | |
| 2 | 18.3 | Benzene, 73.2 | 15.9 | Diethylamine hydrochloride, 19.7 | Methylene dichloride, 108 | 16 | 86 | 75 |
| 3 | 12.2 | Toluene, 48.8 | 10.38 | Diethylamine hydrochloride, 13.2 | Methylene dichloride, 72 | 2 | 86 | 75–78 |
| 4 | 6.1 | Toluene, 24.4 | 5.3 | Diethylamine hydrochloride, 6.6 | Ethylene dichloride, 54 | 16 | 89 | 72 |
| 5 | 18.3 | Xylene, 73.2 | 15.9 | Diethylamine hydrochloride, 19.7 | Chloroform, 162 | 16 | 93 | 66 |
| 6 | 6.1 | Toluene, 24.4 | 5.3 | Triethylamine hydrochloride, 8.27 | Methylene dichloride, 50 | 16 | 90 | 70.7 |
| 7 | 6.1 | do | 5.3 | Pyrrolidine hydrochloride, 6.47 | do | 16 | 92 | 72.5 |
| 8 | 6.1 | do | 5.3 | Piperidine hydrochloride, 7.31 | do | 16 | 87 | 77 |
| 9 | 6.1 | Benzene, 24.4 | 5.3 | Cyclohexylamine hydrochloride, 8.14 | Methylene, dichloride, 72 | 16 | 89 | 72 |

EXAMPLE 1

A mixture of 18.3 g. of 2-pyridinealdoxime and 73.2 ml. of toluene is warmed to 50° C. and treated over a period of 90 min. by dropwise addition of 15.9 ml. of dimethyl sulfate. The mixture is then kept at 50° C. for one hour and at 60° C. for 2.5 hours, cooled to room temperature, diluted with a mixture of 1.8 ml. of methylene chloride and 19.8 g. of butylammonium chloride and stirred at room temperature overnight. Filtration gives 22.54 g. of crude 2-pyridinealdoxime methochloride (87% of theoretical yield); M.P. 220° C. (dec.). This material is recrystallized by dissolving in 15 ml. of water at 50° C. and precipitating it from the solution by the addition of 150 ml. of isopropanol. After cooling to 0° C. for 2 hours the colourless crystalline 2-pyridinealdoxime methochloride is collected by filtration, washed with 60 ml. of isopropanol and dried, to give 19.93 g. of purified product, M.P. 229° C. (dec.), or 77% of theoretical yield.

EXAMPLES 2–9

In the same manner as described above, but using the different solvents and reactants described in the following table, reaction temperature during the first stage of from 25–50° C., reaction times of from 1.5 to 16 hours during the second stage, and 1.1 moles of dimethylsul-

We claim:
1. In a process for the production of 2-pyridinealdoxime methochloride wherein 2-pyridinealdoxime metho-methylsulfate is formed as an intermediate product the step which comprises treating said 2-pyridinealdoxime metho-methylsulfate with a hydrocarbon amine hydrochloride selected from the group which consists of diethylamine hydrochloride, triethylamine hydrochloride, butylamine hydrochloride, cyclohexylamine hydrochloride, pyrrolidine hydrochloride and piperidine hydrochloride in a water-immiscible chlorinated lower hydrocarbon solvent.

2. The process defined in claim 1 wherein said water-immiscible chlorinated lower hydrocarbon solvent is one selected from the group which consists of methylene dichloride, chloroform and ethylene dichloride.

References Cited

UNITED STATES PATENTS 2,996,510  8/1961  Green _____ 260—296
3,123,613  3/1964  Bloch _____ 260—296

HENRY R. JILES, Primary Examiner

A. L. ROTMAN, Assistant Examiner

U.S. Cl. X.R.

260—294.8, 999